United States Patent [19]

Renfrew

[11] 3,897,203
[45] July 29, 1975

[54] CARBAZOLE DYESTUFFS
[75] Inventor: Edgar Earl Renfrew, Lock Haven, Pa.
[73] Assignee: American Color & Chemical Corporation, Charlotte, N.C.
[22] Filed: May 25, 1973
[21] Appl. No.: 363,843

Related U.S. Application Data
[63] Continuation-in-part of Ser. No. 230,113, Feb. 28, 1972, abandoned.

[52] U.S. Cl............................. 8/4; 8/41 C; 260/164
[51] Int. Cl................................................ D06p 3/00
[58] Field of Search........................................ 8/41, 4

[56] References Cited
FOREIGN PATENTS OR APPLICATIONS
367,254  3/1963  Switzerland........................ 260/164

OTHER PUBLICATIONS
J. Org. Chem., Vol. 22, pp. 562–564, 1957.

Primary Examiner—Donald Levy
Attorney, Agent, or Firm—Armstrong, Nikaido & Wegner

[57] ABSTRACT

A new series of azo compounds which are derived from the coupling of a diazotized aromatic amine base with an N-substituted carbazole coupler are provided, which are excellent dyes for polyester and also are pigments for rigid plastic materials.

3 Claims, No Drawings

CARBAZOLE DYESTUFFS

This application is a continuation-in-part of Ser. No. 230,113, filed Feb. 28, 1972 and now abandoned.

BACKGROUND OF THE INVENTION

Although the azo series of compounds is well known in the art, and many azo compounds have been proposed as dyes for synthetic fibers, the search for new azo compounds has continued in recent years in view of new requirements for successful commercial dyes and pigments.

In the area of dyes for synthetic fibers, many compounds which have previously been found successful for dyeing modern synthetics such as polyesters are unsuited to sophisticated modern treatments, for example, thermofixation. Many compounds which had previously been used for the dyeing of polyester due to desirable characteristics such as depth of shade and light fastness do not have the necessary fastness to high temperature treatments, which is necessary for thermofixation.

In the area of pigments for rigid plastics, the search for new compounds which are suitable as pigments for these modern plastics has also continued.

In the azo area, carbazole-containing compounds have been proposed. Muth, U.S. Pat. No. 2,036,627, has proposed the use of aminocarbazoles as bases for preparing dyes ingrain in cotton fibers. Fischer, U.S. Pat. No. 2,204,958, has proposed hydroxycarbazoles as couplers, which provide essentially phenolic couplings, thus quite unlike the present dyes in structure and performance. Further attempts to provide carbazole dyes are disclosed in Fischer, U.S. Pat. No. 2,222,763. A complicated carbazole system is disclosed in Grimmel et al, U.S. Pat. No. 2,408,421. The compounds disclosed in the above patents are all relatively complex. A relatively simple carbazole is disclosed in the chemical literature which results from coupling N-ethyl carbazole with a diazotized 2,4-dinitroaniline base (Houben-Weyl, Volume X, Section 3, page 253). However, there is no report in Houben-Weyl of the use of this relatively simple compound for the dyeing of synthetic fibers not of the pigmentation of rigid plastic materials. A prejudice against such nitro-substituted compounds is further exemplified from a Swiss patent to Merian, No. 367,254.

I have now discovered that a relatively simple class of carbazoles which are excellent dyes for polyester fibers, and furthermore may be used as pigments for the coloration of rigid plastic substrates.

SUMMARY OF THE INVENTION

In accordance with the invention, I have discovered a novel series of azo dyes of the formula

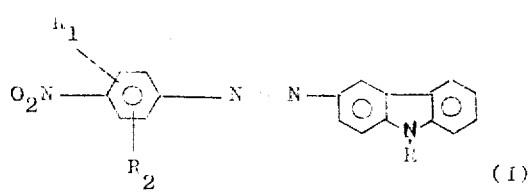

wherein each of $R_1$ and $R_2$ is independently hydrogen, halogen, nitro, chloro, bromo, cyano, trifluoromethyl, phenylazo, nitrophenylazo, nitrochlorophenylazo, lower alkyl, lower alkoxy, lower alkylsulfonyl, chloro(lower alkyl), bromo(lower alkyl), chloro(lower alkoxy), bromo(lower alkoxy), carbonamido, lower alkyl carbonamido, di(lower alkyl)carbonamido, sulfamyl, lower alkylsulfamyl, and di-(lower alkyl)sulfamyl;

R is alkyl of 4 to 9 carbon atoms or aralkyl of 7 to 9 carbon atoms, the aryl portion of said aralkyl being a member selected from the group consisting of phenyl, nitrophenyl, chlorophenyl, bromophenyl, cyanophenyl and sulfamylphenyl.

The compounds have been found to be excellent dyes for polyesters. They also may be used to pigment rigid plastic substrates.

DETAILED DESCRIPTION OF THE INVENTION

The compounds of the invention are produced through the coupling of a carbazole with a diazotized aromatic amine.

The carbazole coupler has the formula

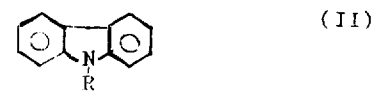

where R is as defined above. The diazotized aromatic amine base has the formula

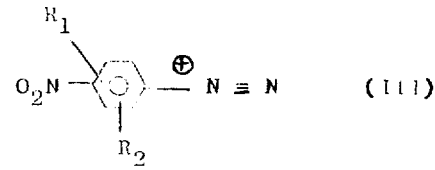

wherein $R_1$ and $R_2$ are as defined above. The diazotized aromatic amine (III) is produced through conventional procedures from a primary aromatic amine of the formula

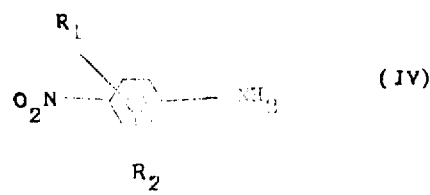

The base (IV) is diazotized in the usual way by heating it in an aqueous solution of strong mineral acid such as hydrochlor or phosphoric acid, cooling the resulting solution to a temperature of 0°–10°C and adding thereto a quantity of sodium nitrite slightly in excess of the stoichiometric requirement. An alternate method of diazotization involves dissolving sodium nitrite in concentrated sulfuric acid, heating to a temperature of about 60°–70°C, cooling the resulting solution to 0°–10°C and adding thereto the aminobenzene.

The azo dyes of the invention are made by the reaction of the diazotized base (III) with the coupler (II) by adding the diazonium salt to a cold aqueous solution of the coupler. A bufferin agent, such as sodium acetate is added to reduce the acidity to a pH of 5 to 7. The mixture is allowed to react for up to several hours at room temperature and is thereafter filtered and washed acid free. The desired azo product is thus obtained in the form of a wet cake. The term "lower" as used in the definition of Ar refers to the aliphatic groupings with less than about four carbon atoms, for example, methyl, ethyl, propyl and butyl.

The base (IV) is diazotized in the usual way by heating it in an aqueous solution of strong mineral acid such as hydrochloric or phosphoric acid, cooling the resulting solution to a temperature of 0°–10°C and adding thereto a quantity of sodium nitrite slightly in excess of the stoichiometric requirement. An alternate method of diazotization especially useful for less basic aminobenzenes involves dissolving sodium nitrite in concentrated sulfuric acid, heating to a temperature of about 60°–70°C, cooling the resulting solution to 0°–10°C and adding thereto the aminobenzene.

The azo dyes of the invention are made by the reaction of the diazotized base (III) with the coupler (II) by adding the diazonium salt to a cold aqueous solution of the coupler. A buffering agent, such as sodium acetate is added to reduce the acidity to a pH of 5 to 7. The mixture is allowed to react in the cold for several hours, with the temperature gradually coming to that of the room after which period it is filtered and washed acid free. The desired azo product is thus obtained in the form of a wet cake. To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated napthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

The compounds of the invention may be used for the coloration of rigid plastic substrates. The rigid plastic substrates contemplated within the scope of the invention are those plastic materials capable of being pigmented with the compounds of the invention, and will be referred to here as "rigid plastic substratesThe rigid substrates". substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenoic resins; polycarbonates; and polyesters. It is understood that the rigid plastic substrates include those materials capable of being pigmented with the compounds of the invention, and therefore copolymers of the above classes of compounds, such as styrenebutadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate, ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylates, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may very widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

EXAMPLE 1

9-n-Butyl-3-(4-nitro-2-trifluoromethylphenylazo)carbazole

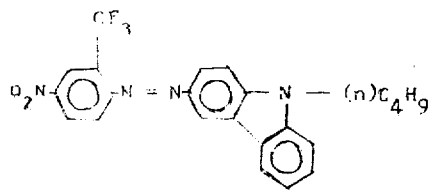

A flask fitted with a stirrer and a thermometer was charged with 200 parts 66° Be sulfuric acid. Seven parts sodium nitrite were added below 15°C, and the mixture was heated to 65°C to obtain complete solution. It was then cooled to 5°C, at which temperature 20.6 parts 2-amino-5-nitrobenzotrifluoride were added at 10°–13°C. The diazotization was complete after two hours stirring, during which time the temperature rose to 20°C. The reaction mass was poured into 300 parts ice and 200 parts water, and the resulting solution iced to 5°C.

During the same period, the coupler was prepared by dissolving 23.4 parts 9-butylcarbazole in 400 parts denatured ethanol containing 5 g. "Tween 20" (a commercial material said to be a polyoxyethylene derivative of anhydrosorbitol).

The diazonium solution was added at 5°C to the coupler solution and the mixture was stirred for 70 hours at 5° to 8°C until there was only a trace of unreacted diazonium sulfate present. 9-n-Butyl-3-(4-nitro-2-trifluoromethylphenylazo)carbazole separated in orange crystals. The product was isolated by filtration, washed acid free with water and sucked dry. The presscake was slurried in 300 parts denatured alcohol, boiled for 1 hour under reflux conditions, and allowed to cool to 32°C. The purified dyestuff was filtered off, washed with denatured alcohol and dried. It melted at 176°–177°C.

One part was combined with one part dispersing agent "Lignosol FTA" (a lignin sulfonate) and made into a 10% color content paste by ball milling with water. It dyed polyester fabric in bright orange shades of good light fastness and sublimation fastness by the established dyeing methods.

EXAMPLE II 9-n-Butyl-3-(4-nitro-2-methylsulfonylphenylazo)carbazole

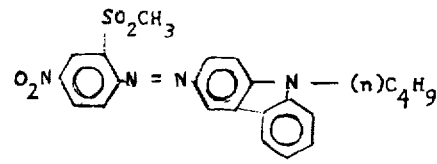

A flask which had been fitted with a stirrer, a dropping funnel and a thermometer was charged with 200 parts 66° Be sulfuric acid. To this were added in portions 14.2 parts sodium nitrite. After heating to 65°C and subsequent cooling to 15°C, 400 parts of acetric acid were slowly added at 15–25°C, followed at 13° to 15°C by 44.2 parts 97.3% 2-amino-5-nitrophenyl methyl sulfone. Two parts sulfamic acid were added after two hours; stirring was continued briefly at 13 to 15°C to destroy any excess of nitrous acid. The coupler, a warm solution made up by dissolving 46.8 parts 9-n-butylcarbazole in 100 parts glacial acetic acid at 50°C, was slowly added at 8 to 11°C. The mixture was stirred sixteen hours, during which time the temperature was allowed to rise to 22°C. It was then poured into 1000 parts ice and 500 parts water. After stirring the mixture for one hour, the product 9-n-butyl-3-(4-nitro-2-methylsulfonylphenylazo)carbazole was filtered off, washed acid free, and dried. It melted at 191–196°C.

One part was combined with one part of dispersing agent, "Lignosol FTA" (a commercially available derivation of lignin sulfonic acid), and made into a 15% color paste by ball milling with water.

The disperse dye colored polyester fiber by carrier dyeing methods, pressure dyeing methods or thermofixation methods in bright yellowish-red shades of excellent fastness properties, including light and sublimation fastness.

EXAMPLE III 9-n-Butyl-3-(6-bromo-2,4-dinitrophenylazo)carbazole

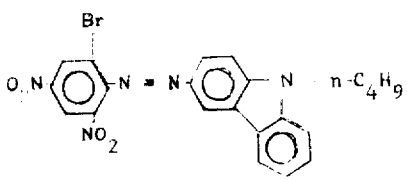

To a suitable vessel was charged 100 parts sulfuric acid 66° Be. To it below 15°C were added 7.1 parts sodium nitrite. The mixture was heated to 65°C and then cooled externally to 10°C. To it was added while stirring 26.2 parts 6-bromo-2,4-dinitroaniline. Stirring was continued for 2 hours, during which time the temperature was allowed to rise to 25°C. The mass was drowned into 250 parts ice and water.

To the above mixture at 0°C was added at once a solution of 23.4 parts 9-n-butylcarbazole in 150 parts glacial acetic acid.

The mass was allowed to stir for 3 hours below 10°C, and then for 16 hours at room temperature.

The product which separated was isolated and dispersed in a manner similar to that described in Example I.

Dyeings on polyester produced by the disperse product were bright red in hue. The sublimation fastness was outstandingly excellent; the light fastness was fair.

EXAMPLE IV 9-n-Heptyl-3-(2-chloro-4-nitrophenylazo)charbazole

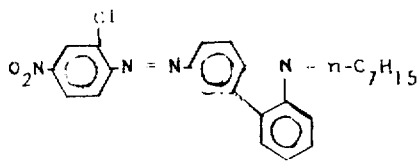

To a flask, fitted with a stirrer, a thermometer and a dropping funnel, were charged 200 parts 66° Be sulfuric acid. Below 15°C there were slowly added 14.2 parts sodium nitrite. After heating to 65°C to obtain complete solution and then cooling to 15°C, 400 parts glacial acetic acid were slowly added at 10°–25°C. This was followed by the addition of 34.5 parts 2-chloro-4-nitroaniline at 8° to 12°C. The charge was stirred sixteen hours, during which time the temperature was allowed to rise to 22°C. Two parts of sulfamic acid were added and, after cooling to 2°C, 57.8 parts 9-n-heptylcarbazole.

The mixture was stirred for 5 to 6 hours, during which time the temperature was allowed to rise to 22°C, after which period it was poured into 1000 parts ice and 500 parts water. 9-n-Heptyl-3-(2-chloro-4-nitrophenylazo) carbazole separated in bright orange crystals which were collected by filtration, washed acid free and dried. The melting range was 205°–208°C. One part was combined with one part of dispersing agent, Lignosol FTA (a commercially available lignin sulfonate), and made into a 15% color content paste by ball milling with water.

The resultant disperse dye colored polyester fiber by carrier, pressure or thermofixation dyeing methods in bright reddish orange shades of good light fastness and resistance to sublimation.

EXAMPLE V

9-Benzyl-3(2-chloro-4-nitrophenylazo)carbazole

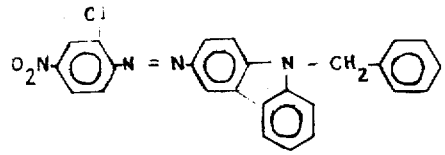

A dye was prepared in the manner described in Example 4 but using 52.0 parts 9-benzylcarbazole instead of 40.9 parts 9-ethylcarbazole.

The dye had a hue similar to that of the product of Example I. Other properties were similar, except that fastness to sublimation was somewhat superior.

EXAMPLE VI

9-Ethyl-3-(4-nitrophenylazo)carbazole

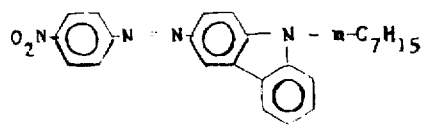

was obtained by replacing 34.5 parts 2-chloro-4-nitroaniline in Example V by 27.6 parts 4-nitroaniline. After recrystallization from denatured alcohol and extraction with acetone, the resultant monoazo material was dispersed in the usual manner. Polyester fiber was dyed by standard methods in bright orange shades of excellent fastness properties.

EXAMPLE VII

9-Ethyl-3-(2-cyano-4-nitrophenylazo)carbazole

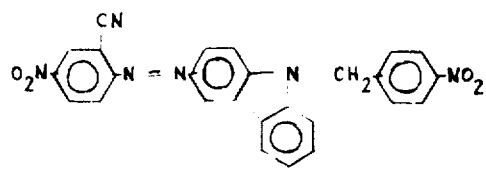

A flask fitted with a stirrer and a thermometer was charged with 150 parts 66° Be sulfuric acid. To this were added 7.1 parts sodium nitrite below 10°C. After heating this charge to 65°C and subsequently cooling it to 5°C, 16.8 parts of 97% 2-amino-5-nitrobenzonitrile were added at 5° to 8°C. The mixture was stirred at the same temperature for 4 hours, and then poured into 300 parts ice and 200 parts water containing one part sulfamic acid, while maintaining the temperature below 10°C by adding ice. The solution was clarified by filtration, and then added in portions at 5°–10°C. to a solution of 30.5 parts 9(p-nitrobenzyl) carbazole and 400 parts denatured alcohol containing 2.5 parts Tween 20. The coupling was completed after stirring for 16 hours at 3° to 8°C. 9-(p-nitrobenzyl)-3-(2 -cyano-4-nitrophenylazo)carbazole separated in orange and red crystals, which were collected by filtration, washed acid free and dried. After recrystallization from 5 parts of denatured alcohol the product melted at 212° to 214°. One part was combined with one part of a suitably dispersing agent and made into a 5% color content paste by ballmilling. It dyed polyester fiber in scarlet shades of excellent light fastness and sublimation resistance.

EXAMPLE VIII–XXIII

By diazotizing the appropriate primary aromatic amine (IV) to form the corresponding diazotized aro-

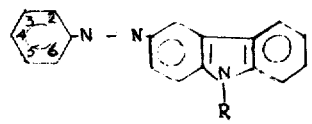

The following table lists the substituents on the above pictured phenyl nucleus, the group R and the shade produced when the compound is dyed on polyethylene terephthalate.

SUBSTITUENTS ON PHENYL

| Example | 2 | 3 | 4 | 5 | 6 | R | Shade |
|---|---|---|---|---|---|---|---|
| VIII | H | H | $NO_2$ | H | H | $CH_2$–⟨phenyl⟩ | Orange |
| IX | $NO_2$ | H | $NO_2$ | H | H | $n$-$C_4H_9$ | Red |
| X | $NO_2$ | H | $NO_2$ | H | Br | $-CH_2$–⟨phenyl⟩ | Red |
| XI | CN | H | $NO_2$ | H | H | $-CH_2$–⟨phenyl⟩Cl | Scarlet |
| XII | Cl | H | $NO_2$ | H | H | $n$-$C_4H_9$ | Red-Orange |
| XIII | Cl | H | $NO_2$ | H | Cl | $-CH_2-CH(CH_3)_2$ | Red-Orange |
| XIV | $OCH_3$ | H | $NO_2$ | H | H | $n$-$C_4H_9$ | Yellow-Red |
| XV | $CONH_2$ | H | $NO_2$ | H | H | $n$-$C_4H_9$ | Reddish-Orange |
| XVI | $NO_2$ | H | $NO_2$ | H | CN | $n$-$C_4H_9$ | Bluish-Red |
| XVII | $CH_3$ | H | $NO_2$ | H | H | $CH_2$–⟨phenyl⟩ | Reddish-Orange |
| XVIII | $CF_3$ | H | $NO_2$ | H | H | $CH_2$–⟨phenyl⟩ | Orange |
| XIX | Cl | H | $NO_2$ | H | H | ⟨phenyl⟩ | Reddish-Orange |
| XX | H | H | $NO_2$ | H | H | $-CH_2CH_3$ | Reddish-Orange |
| XXI | Cl | H | $NO_2$ | H | H | $t$-$C_4H_9$ | Reddish-Orange |
| XXII | Cl | H | $NO_2$ | H | H | $sec$-$C_4H_9$ | Reddish-Orange |
| XXIII | Cl | H | $NO_2$ | H | H | $-CH_2$–⟨phenyl⟩$SO_2NH_2$ | Reddish-Orange | matic amine base (III), and coupling the resultant diazontized aromatic amine base (III) with an appropriate carbazole couple (II) according to the procedure of Example 1, compounds which are suitable for dyeing polyethylene terephthalate and for pigmenting rigid plastic substrates are obtained.

The compounds of these examples are all derivatives of substituted anilines as the primary aromatic amine (IV), and form compounds having the general formula

What is claimed is:

1. A polyester textile material dyed with a compound of the formula

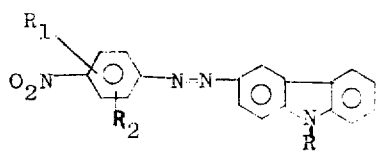

wherein
- each of $R_1$ and $R_2$ is independently hydrogen halogen, nitro, chloro, bromo, cyano, trifluoromethyl, lower alkoxy, lower alkylsulfonyl, chloro(lower alkyl), carbonamide, lower alkyl carbonamido, di(lower alkyl)carbonamido, sulfamyl, lower alkylsulfamyl, and di-(lower alkyl)sulfamyl;
- R is alkyl of 4 to 9 carbon atoms or aralkyl of 7 to 9 carbon atoms, the aryl portion of said aralkyl being a member selected from the group consisting of phenyl, nitrophenyl, chlorophenyl, bromophenyl, cyanophenyl and sulfamylpheny.

2. A polyester textile material of claim 1 wherein R is n-butyl.

3. A polyester textile material of claim 1 where said compound is of the formula:

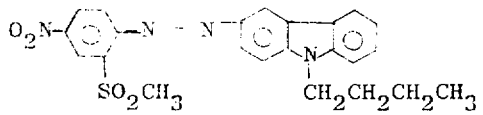

* * * * *